US012570254B2

(12) United States Patent
Hansmann

(10) Patent No.: US 12,570,254 B2
(45) Date of Patent: Mar. 10, 2026

(54) DECOUPLED POWER BRAKE AND ELECTRONIC STABILITY CONTROL SYSTEM IN A VEHICLE

(71) Applicant: Robert Bosch GmbH, Stuttgart (DE)

(72) Inventor: Simon Hansmann, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 18/434,117

(22) Filed: Feb. 6, 2024

(65) Prior Publication Data

US 2025/0091556 A1     Mar. 20, 2025

Related U.S. Application Data

(60) Provisional application No. 63/582,750, filed on Sep. 14, 2023.

(51) Int. Cl.
B60T 8/1755 (2006.01)
B60T 8/171 (2006.01)
(Continued)

(52) U.S. Cl.
CPC ............ B60T 8/1755 (2013.01); B60T 8/171 (2013.01); B60T 8/172 (2013.01); B60T 8/175 (2013.01);
(Continued)

(58) Field of Classification Search
CPC ........ B60T 8/1755; B60T 8/171; B60T 8/172; B60T 8/175; B60T 8/885; B60T 8/94; B60T 2270/402; B60T 2270/604
See application file for complete search history.

(56) References Cited

U.S. PATENT DOCUMENTS 9,174,618 B2     11/2015     Bachmaier et al.
9,776,604 B2     10/2017     Lee et al.
(Continued)

FOREIGN PATENT DOCUMENTS

DE     102017012130 A1 *     7/2018     .......... B60T 8/17636
DE     102020102590 A1 *     7/2021     ............. B60T 8/885
(Continued)

OTHER PUBLICATIONS

Mark Sauerwald, "CAN bus, Ethernet, or FPD-Link: Which is best for automotive communications?", First quarter of 2014, Texas Instruments Incorporated, Analog Applications Journal, pp. 20-21. PDF File Name: "CANbus_Ethernet_Automotive Communications. pdf" (Year: 2014).*
(Continued)

*Primary Examiner* — Grant Moubry
*Assistant Examiner* — Ruben Picon-Feliciano
(74) *Attorney, Agent, or Firm* — Michael Best & Friedrich LLP

(57)     ABSTRACT

Examples provide systems and methods for performing hydraulic braking in a vehicle. One system includes a set of hydraulically controlled brakes, a set of valves coupled to the set of brakes and configured to modulate hydraulic pressure applied to the brakes, a first hydraulic system including a primary hydraulic pressure generator, and a first controller, and a second hydraulic system including a backup hydraulic pressure generator and a second controller. The first controller is configured to receive sensor data. Based on the sensor data, the first controller determines an amount of hydraulic pressure to apply to each of the hydraulically controlled brakes, transmits a pressure command to the primary hydraulic pressure generator for generating hydraulic pressure, and transmits, using a high speed com-
(Continued)

munication connection a valve control command to the second controller.

16 Claims, 6 Drawing Sheets

(51) Int. Cl.

| | | |
|---|---|---|
| *B60T 8/172* | (2006.01) | |
| *B60T 8/175* | (2006.01) | |
| *B60T 8/88* | (2006.01) | |
| *B60T 8/94* | (2006.01) | |

(52) U.S. Cl.
CPC ................ *B60T 8/885* (2013.01); *B60T 8/94* (2013.01); *B60T 2270/402* (2013.01); *B60T 2270/604* (2013.01)

(56) References Cited

U.S. PATENT DOCUMENTS

| | | | |
|---|---|---|---|
| 10,065,622 | B2 | 9/2018 | Kikawa et al. |
| 11,548,490 | B2 | 1/2023 | Weitze |
| 2008/0060889 | A1 | 3/2008 | Tsuruta |

| | | | | |
|---|---|---|---|---|
| 2015/0061362 | A1 | | 3/2015 | Kikawa et al. |
| 2018/0134268 | A1 | * | 5/2018 | Knechtges ............ B60T 13/662 |
| 2020/0114894 | A1 | | 4/2020 | Leiber |
| 2021/0031741 | A1 | * | 2/2021 | Alford .................... B60T 13/58 |
| 2022/0105914 | A1 | | 4/2022 | Leiber et al. |
| 2022/0212639 | A1 | * | 7/2022 | Takahashi ............ B60T 13/686 |
| 2022/0227340 | A1 | | 7/2022 | Kim et al. |

FOREIGN PATENT DOCUMENTS

| | | | | |
|---|---|---|---|---|
| DE | 102020103660 | A1 | | 8/2021 |
| EP | 4190650 | A1 | | 6/2023 |
| WO | WO-2016184616 | A1 | * | 11/2016 ............ B60T 13/745 |

OTHER PUBLICATIONS

Machine Translation of DE 102017012130 A1 PDF File Name: "DE102017012130A1_Machine_Translation.pdf" (Year: 2019).*
Machine Translation of WO 2016184616 A1 PDF File Name: "WO2016184616A1_Machine_Translation.pdf" (Year: 2016).*
Machine Translation of DE 102020102590 A1 PDF File Name: "DE102020102590A1_Machine_Translation.pdf" (Year: 2021).*
International Search Report for Application No. PCT/EP2024/075085 dated Dec. 10, 2024 (5 pages).

* cited by examiner

DECOUPLED POWER BRAKE AND ELECTRONIC STABILITY CONTROL SYSTEM IN A VEHICLE

RELATED APPLICATIONS

This application claims the benefit of U.S. Provisional Patent Application No. 63/582,750, filed Sep. 14, 2023, the entire content of which is herein incorporated by reference.

FIELD

Embodiments, examples, and aspects described herein relate to, among other things, systems and methods for performing hydraulic baking in a vehicle.

SUMMARY

Traditional vehicle brake systems include both a decoupled power brake (DPB) system and an electronic stability control (ESC) system to implement hydraulic braking in the vehicle. The DPB system and the ESC system each include a hydraulic pump and a large controller to implement the respective functionalities of the DPB system and the ESC system. The DPB system and the ESC system are therefore expensive to implement and occupy large amounts of space in a vehicle.

Thus, examples described herein provide a system for a vehicle. The system includes a set of hydraulically controlled brakes, a set of valves coupled to the set of hydraulically controlled brakes and configured to modulate hydraulic pressure applied to each of the hydraulically controlled brakes, a first hydraulic system including a primary hydraulic pressure generator, and a first controller, and a second hydraulic system including a backup hydraulic pressure generator and a second controller. The first controller is configured to receive sensor data, based on the sensor data, determine an amount of hydraulic pressure to apply to each of the hydraulically controlled brakes, transmit a pressure command to the primary hydraulic pressure generator for generating hydraulic pressure, and transmit, using a high speed communication connection a valve control command to the second controller. The second controller is configured to receive the valve control command, and based on the valve control command, transmit a control signal to the set of valves for modulating the set of valves.

In some aspects, the primary hydraulic pressure generator is larger than the backup hydraulic pressure generator.

In some aspects, the second controller is configured to transmit the sensor data to the first controller using the high speed communication connection.

In some aspects, the high speed communication connection is an Ethernet connection.

In some aspects, the primary hydraulic pressure generator includes a plurality of damping elements.

In some aspects, the first hydraulic system is a decoupled power brake system, and the first controller is a decoupled power brake controller.

In some aspects, the second hydraulic system is an electronic stability control system, and the second controller is an electronic stability controller.

In some aspects, the first controller is configured to compute a hydraulic pressure requirement for at least one selected from the group consisting of anti-lock braking, vehicle dynamic stabilization, traction control, fading support, highly automated driving (HAD) backup, regenerative brake blending, driver comfort braking, autonomous braking, and brake assist.

Another example provides a method implemented in a vehicle braking system. The method includes, with a first controller included in a first hydraulic system having a primary hydraulic pressure generator, receiving sensor data, based on the sensor data, determining an amount of hydraulic pressure to apply to each brake of a set of hydraulically controlled brakes, transmitting a pressure command to the primary hydraulic pressure generator for generating hydraulic pressure, and transmitting, using a high speed communication connection a valve control command to a second controller included in a second hydraulic system having a backup hydraulic pressure generator. The method also includes, with the second controller, receiving the valve control command, and based on the valve control command, transmitting a control signal to a set of valves coupled to the set of hydraulically controlled brakes, the control signal used for modulating the set of valves.

In some aspects, the primary hydraulic pressure generator is larger than the backup hydraulic pressure generator.

In some aspects, the method further includes transmitting, with the second controller, the sensor data to the first controller using the high speed communication connection.

In some aspects, the high speed communication connection is an Ethernet connection.

In some aspects, the primary hydraulic pressure generator includes a plurality of damping elements.

In some aspects, the first hydraulic system is a decoupled power brake system, and the first controller is a decoupled power brake controller.

In some aspects, the second hydraulic system is an electronic stability control system, and the second controller is an electronic stability controller.

In some aspects, the method further includes, with the first controller, computing a hydraulic pressure requirement for at least one selected from the group consisting of anti-lock braking, vehicle dynamic stabilization, traction control, fading support, highly automated driving (HAD) backup, regenerative brake blending, driver comfort braking, autonomous braking, and brake assist.

DETAILED DESCRIPTION

Figure 1:
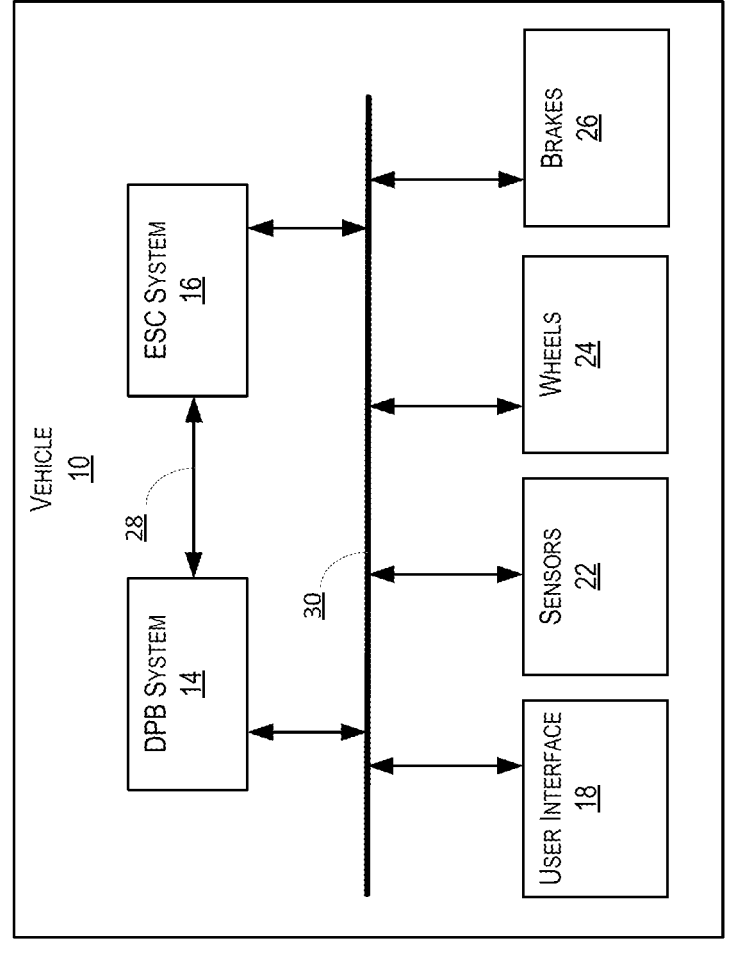
FIG. 1 is a schematic illustration of a vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 schematically illustrates a vehicle 10, according to some aspects. In some instances, the vehicle 10 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. However, in some instances, the vehicle 10 is not an autonomous vehicle.

In the illustrated example, the vehicle 10 includes a decoupled power brake (DPB) system 14, an electronic stability control (ESC) system 16 (described in greater detail below with respect to FIGS. 2-5), a user interface 18, a plurality of sensors 22, a set of wheels 24, and a set of brakes 26 coupled to the wheels 24. The components of the vehicle 10, along with other various modules and components are electrically and communicatively coupled to each other via direct connections or by or through one or more control or data buses (for example, the bus 30), which enable communication therebetween. In some instances, the bus 30 is a controller area network (CAN) bus. In some instances, the bus 30 is an automotive Ethernet, a FlexRay™ communications bus, or another suitable bus.

In some embodiments, the DPB system 14 and the ESC system 16 are communicatively coupled with each other via a high speed communication connection 28. The high speed communication connection 28 enables components of the DPB system 14 and the ESC system 16 to communicate with each other at a rate faster than a traditional automotive communication bus (e.g., a CAN bus). The high speed communication connection 28 may enable communication between the DPB system 14 and the ESC system 16 on a loop of approximately 1 millisecond (ms) or faster. The high speed communication connection 28 may be implemented as a wired or wireless connection. For example, the high speed communication connection 28 may be an Ethernet connection, a Bluetooth connection, or another suitable high speed communication connection 28.

The user interface 18 includes one or more input components of the vehicle 10, one or more output components of the vehicle 10, or a combination there. For example, the user interface 18 includes one or more user-actuatable components for controlling the vehicle 10 (e.g., a steering wheel, a brake pedal, a gas pedal, a parking brake actuator, etc.).

The sensors 22 measure one or more attributes of the vehicle 10 and the environment around the vehicle 10 and communicate information regarding those attributes to the other components of the vehicle 10 using, for example, messages transmitted on the bus 30. The sensors 22 may include, for example, sensors detecting accelerator pedal position and/or brake pedal position, wheel speed sensors, steering angle sensors, vehicle speed sensors, yaw, pitch, and roll sensors, Hall effect sensors, force sensors, torque sensors, rotor position sensors, and vehicle proximity sensors (for example, ultrasonic). In some instances, the sensors 22 are similar to sensor sets used in an electronic stability control (ESC) system and similar vehicle control systems.

The set of wheels 24 include at least two wheels (e.g., at least one front wheel and at least one rear wheel). However, the wheels 24 may include more than two wheels. For example, the wheels 24 may include two front wheels and two rear wheels. The set brakes 26 are coupled to at least a subset of the set of wheels 24 and are controlled by a supply of hydraulic fluid to brake the wheels 24. In some embodiments, there may be fewer brakes 26 than wheels 24, wherein only some wheels of the vehicle are associated with brakes.

Figure 2:
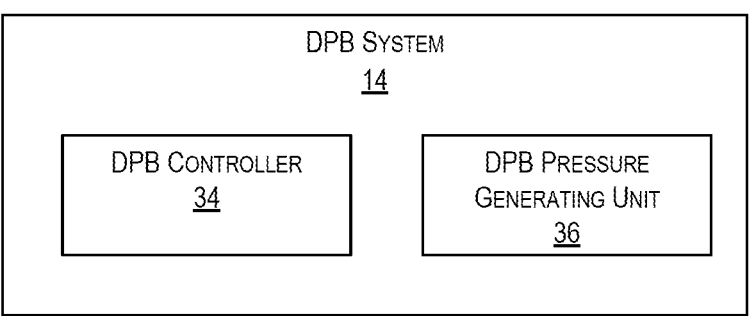
FIG. 2 illustrates a decoupled power brake system included in the vehicle of FIG. 1, according to some aspects.

FIG. 2 illustrates the DPB system 14 according to some examples. In one example, the DPB system 14 includes a DPB controller 34 and a DPB pressure generating unit 36. The DPB controller 34 receives sensor data from the plurality of sensors 22 and determines control commands for the DPB system 14, the ESC system 16, and/or other vehicle control systems included in the vehicle 10. In some instances, the DPB controller 34 is part of one or more electronic processors that implement control of the vehicle 10. The DPB pressure generating unit 36 generates hydraulic pressure according to commands received from the DPB controller 34. It should be understood that the DPB system 14 may include additional components than those illustrated in FIG. 3 and in various configurations. The DPB system 14 may also include a set of DPB valves for supplying pressure to the set of brakes 26 (e.g., via valve control system).

Figure 3:
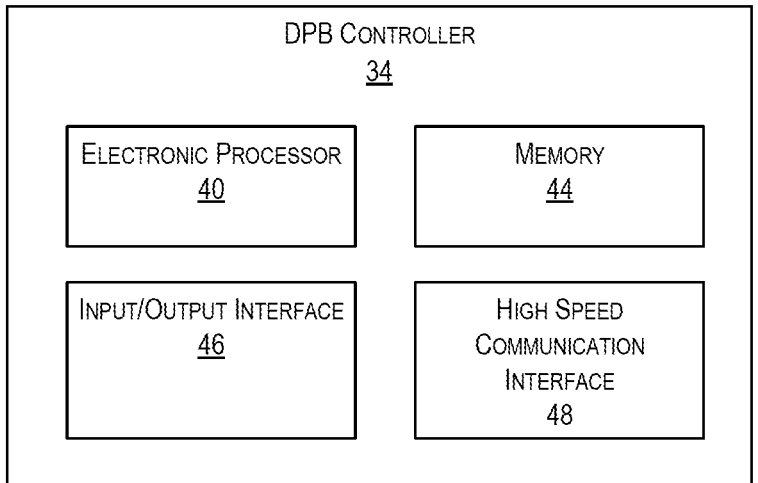
FIG. 3 illustrates a decoupled power brake controller included in the decoupled power brake system of FIG. 2, according to some aspects.

Referring now to FIG. 3, the DPB controller 34 includes a DPB electronic processor 40 (for example, a microprocessor, application specific integrated circuit, etc.), a DPB memory 44, a DPB input/output interface 46, and a high speed communication interface 48. The DPB memory 44 may be made up of one or more non-transitory computer-readable media and may include a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The DPB electronic processor 40 is coupled to the DPB memory 44, the DPB input/output interface 46, and the high speed communication interface 48. The DPB electronic processor 40 sends and receives information (for example, from the DPB memory 44, the DPB input/output interface 46, and/or the high speed communication interface 48) and processes the information by executing one or more software instructions or modules, stored in the DPB memory 44, or another non-transitory computer readable medium. The software can include firmware, one or more applications, program data, filters, rules, one or more program modules, and other executable instructions.

The DPB electronic processor 40 receives sensor data from the sensors 22 and vehicle control commands (e.g., from the user interface 18) via the input/output interface 46. The DPB electronic processor 40 also transmits information to other components of the vehicle 10 via the input/output interface 46. The input/output interface 46 is communicatively coupled to the components of the vehicle 10 via the bus 30. The DPB electronic processor 40 exchanges information with components of the ESC system 16 via the high speed communication interface 48 (e.g., using the high speed communication connection 28). For example, as illustrated, the DPB system 14 is directly communicatively connected to the ESC system 16 via the high speed communication connection 28.

The DPB electronic processor 40 is configured to retrieve from the DPB memory 44 and execute, among other things, software (instructions) for performing methods as described herein. The DPB input/output interface 46 transmits and receives information from devices external to the DPB controller 34 (for example, components of the vehicle 10 via the bus 30). It should be understood that the DPB controller 34 may include additional components than those illustrated in FIG. 3 and in various configurations. For example, in some examples, the DPB controller 34 includes multiple DPB electronic processors 40, multiple DPB memory modules 44, multiple DPB input/output interfaces 46, multiple high speed communication interfaces 48, or a combination thereof.

The DPB electronic processor 40 calculates or determines hydraulic pressure requirements based on sensor data received from the plurality of sensors 22, as well as user input from the driver of the vehicle 10 (e.g., via one or more components of the user interface 18). Functions of the DPB controller 34 will be described in greater detail below.

Figure 4:
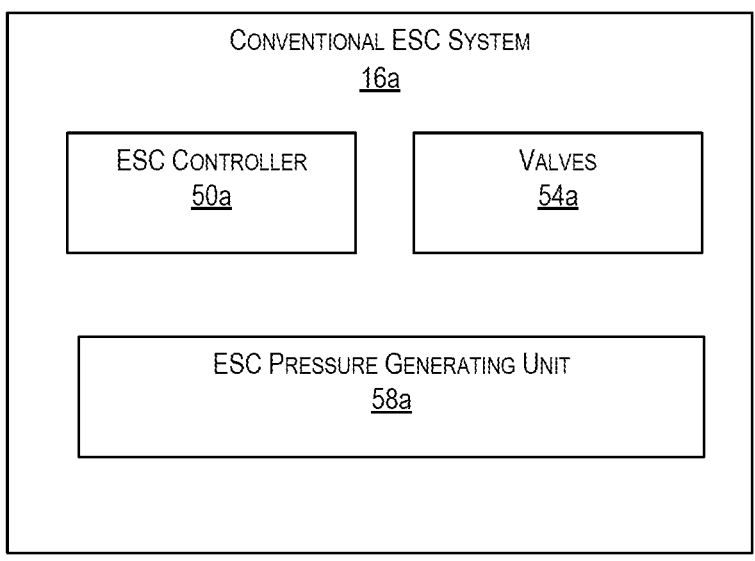
FIG. 4 illustrates an electronic stability control system, according to some aspects.
Figure 5:
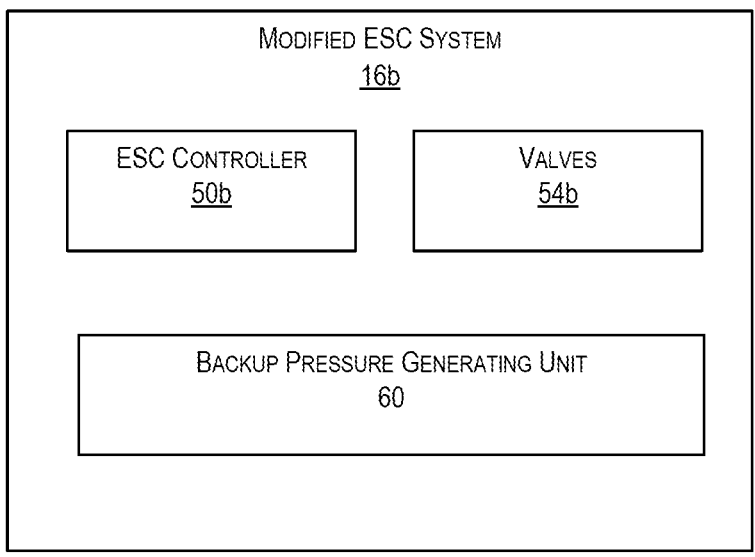
FIG. 5 illustrates a modified electronic stability control system included in the vehicle of FIG. 1, according to some aspects.

Referring now to FIG. 4, an ESC system 16a is illustrated. In some vehicle braking systems, the ESC system 16 of FIG. 1 is implemented using the ESC system 16a of FIG. 4. The ESC system 16a includes an ESC controller 50a, pressure control valves 54a, and an ESC pressure generating unit 58a. In some instances, the ESC pressure generating unit 58a may include similar components as the DPB pressure generating unit 36 included in the DPB system 14. For example, both the DPB pressure generating unit 36 of the DPB system 14 and the ESC pressure generating unit 58a may include a hydraulic pump for supplying braking pressure to the brakes 26 of the vehicle 10. However, in some instances, the ESC pressure generating unit 58a includes different components from the DPB pressure generating unit 36 included in the DPB system 14. For example, the ESC pressure generating unit 58a may be a pump-based system, and the DPB pressure generating unit 36 may be a plunger-based system.

The ESC system 16a is responsible for providing wheel-specific hydraulic pressure for the anti-lock control braking system (ABS) in the vehicle 10, vehicle dynamic stabilization, traction control, fading support, highly automated driving (HAD) backup systems, or a combination thereof. For example, the ESC controller 50a may perform calculations for pressure control for such systems and transmit control signals to the ESC pressure generating unit 58a for generating requested hydraulic pressure. The ESC system 16a may provide wheel-specific pressure support and modulation. Therefore, the ESC controller 50a also transmits control signals for controlling the wheel-specific valves 54a to supply wheel-specific pressure to the brakes 26.

The DPB system 14 is responsible for providing hydraulic pressure to provide system level pressure (e.g., pressure to all four wheels 24 of the vehicle 10) for driver comfort braking, brake assist, autonomous braking, regenerative bake blending, or a combination thereof. Unlike the ESC system 16a, the DPB system 14 does not provide wheel-specific pressure. The DPB controller 34 performs calculations for pressure control for such systems, and transmits control signals to the DPB pressure generating unit 36 for generating requested hydraulic pressure. The DPB controller 34 may perform such calculations without knowledge of the pressure requirements of the conventional ESC system 16a. For example, when performing calculations, the DPB controller 34 may or may not take into account pressure requirements for ABS, because such requirements are handled by the ESC controller 50a.

Both the DPB system 14 and the ESC system 16a therefore each require a large, often expensive, controller for performing substantial pressure calculations and respective pressure generating units for supplying the necessary hydraulic pressure. Additionally, components of these pressure generating units (e.g., the DPB pressure generating unit 36 and the ESC pressure generating unit 58a) can cause-undesired noise, heat, and vibration in the vehicle 10. Therefore, FIG. 4 illustrates a modified ESC system 16b which can be implemented as the ESC system 16 of FIG. 1 in place of the ESC system 16a.

The modified ESC system 16b includes a modified ESC controller 50b, pressure control valves 54a, and a backup pressure generating unit 60. Unlike the ESC system 16a, the modified ESC system 16*b* is only responsible for providing backup hydraulic pressure (e.g., using the backup pressure generating unit 60) in the event of a failure in the DPB system 14. The pressure generating functions typically performed by the ESC system 16*a* are instead performed by the DPB system 14. For example, when using the modified ESC system 16*b*, the DPB system 14, and more specifically the DPB pressure generating unit 36, is responsible for generating hydraulic pressure for the anti-lock braking system (ABS) in the vehicle 10, vehicle dynamic stabilization, traction control, fading support, highly automated driving (HAD) backup systems, or a combination thereof. The DPB system 14 additionally remains responsible for generating hydraulic pressure for driver comfort braking, brake assist, autonomous braking, regenerative bake blending, or a combination thereof. Accordingly, the DPB system 14 operates as a primary, or master, hydraulic pressure system for the vehicle 10.

Based on sensor data received from the sensors 22 and user input from the user interface 18 (e.g., steering wheel movement, brake pedal actuation, etc.), the DPB controller 34 performs hydraulic pressure calculations and controls the DPB pressure generating unit 36 to generate hydraulic pressure for the brakes 26. To deliver the appropriate amount of braking pressure to each wheel, the DPB controller 34 generates and transmits, using the high speed communication connection 28, valve control commands to the modified ESC controller 50*b*.

Because the modified ESC system 16*b* is only responsible for providing backup hydraulic pressure, the backup hydraulic pressure generating unit includes smaller components (e.g., a smaller pump) than those required by the DPB system 14 and the ESC system 16*a*. Damping elements, which are included in the ESC system 16*a* and the DPB system 14 for damping hydraulic pressure fluctuations, may also be reduced or removed completely from the modified ESC system 16*b*. Other noise, vibration, and harshness (NVH) elements may also be reduced or removed from the modified ESC system 16*b* given that the system 16*b* is used only for backup pressure generation.

Additionally, because the modified ESC system 16*b* is responsible for fewer hydraulic braking functions, the modified ESC controller 50*b* is smaller in size compared to the ESC controller 50*a* and the DPB controller 34.

Figure 6:
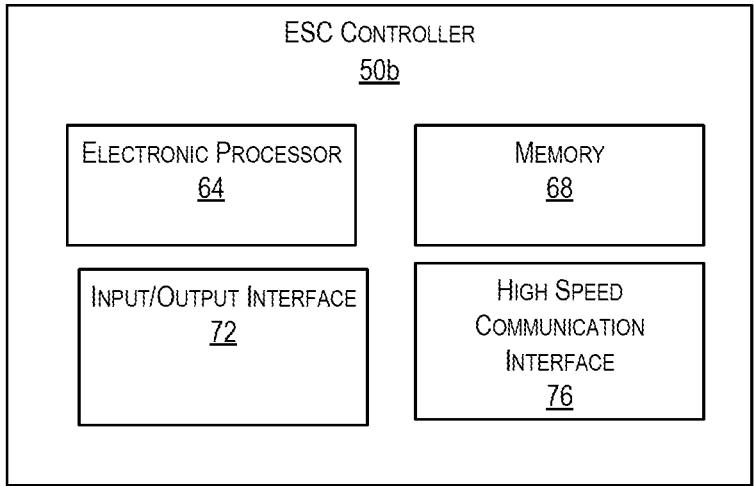
FIG. 6 illustrates an electronic stability controller included in the modified electronic stability control system of FIG. 5, according to some aspects.

FIG. 6 illustrates the modified ESC controller 50*b*, according to some examples. The modified ESC controller 50*b* includes an ESC electronic processor 64 (for example, a microprocessor, application specific integrated circuit, etc.), an ESC memory 68, an ESC input/output interface 72, and a high speed communication interface 76. The ESC memory 68 may be made up of one or more non-transitory computer-readable media and may include at least a program storage area and a data storage area. The program storage area and the data storage area can include combinations of different types of memory, such as read-only memory ("ROM"), random access memory ("RAM"), electrically erasable programmable read-only memory ("EE-PROM"), flash memory, or other suitable memory devices. The ESC electronic processor 64 is coupled to the ESC memory 68, the ESC input/output interface 72, and the high speed communication interface 76. The ESC electronic processor 64 sends and receives information (for example, from the ESC memory 68, the ESC input/output interface 72, and/or the high speed communication interface 76) and processes the information by executing one or more software instructions or modules, stored in the ESC memory 68, or another non-transitory computer readable medium. The software can include firmware, one or more applications, program data, filters, rules, one or more program modules, and other executable instructions.

The ESC electronic processor 64 is configured to retrieve from the ESC memory 68 and execute, among other things, software (instructions) for performing methods as described herein. The ESC input/output interface 72 transmits and receives information from devices external to the modified ESC controller 50*b* (for example, components of the vehicle 10 via the bus 30). It should be understood that the modified ESC controller 50*b* may include additional components than those illustrated in FIG. 6 and in various configurations. For example, in some examples, the modified ESC controller 50*b* includes multiple ESC electronic processors 64, multiple ESC memory modules 68, multiple ESC input/output interfaces 72, multiple high speed communication interfaces 76, or a combination thereof.

The ESC electronic processor 64 exchanges information with components of the DPB system 14 via the high speed communication interface 76 (e.g., using the high speed communication connection 28). For example, the ESC electronic processor 64 receives sensor data from the sensors 22 (e.g., vehicle speed data, wheel angle data, internal pressure data, etc.) via the ESC input/output interface 72 and transmits, via the high speed communication interface 76, some or all of the sensor data to the DPB controller 34 so that the DPB controller 34 can compute hydraulic pressure requirements based on the sensor data.

For example, the ESC electronic processor 64 receives valve control commands from the DPB controller 34 via the high speed communication interface 76. Based on the valve control commands, the ESC electronic processor 64 transmits control signals to the pressure control valves 54*b* to open, close, or otherwise modulate the valves 54*b* for wheel-specific hydraulic pressure generated by the DPB system 14 to be provided to the brakes 26.

Figure 7:
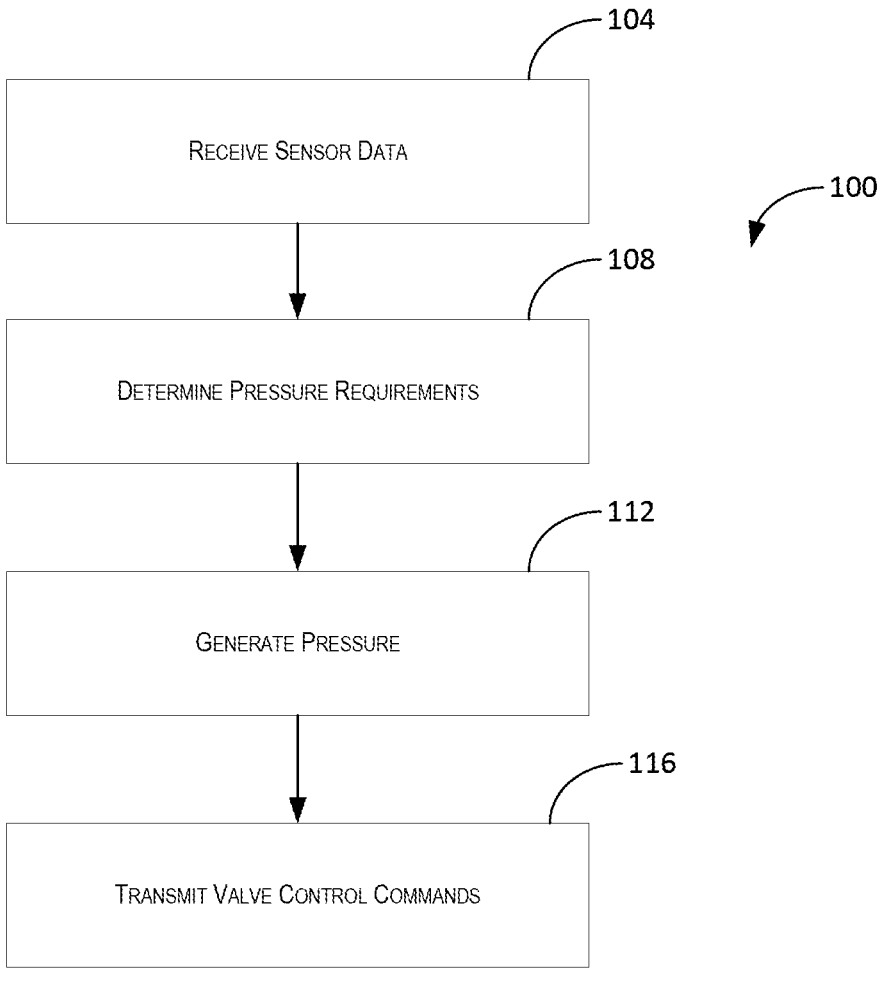
FIG. 7 illustrates a method executed by the decoupled power brake controller of FIG. 2 for performing hydraulic braking, according to some aspects.

FIG. 7 illustrates a method 100 executed by the DPB system 14 for performing hydraulic braking in the vehicle 10. An initial brake request (i.e., a request for hydraulic braking pressure) may be generated by driver input (e.g., driver input pressure on a brake pad of the vehicle 10), an autonomous vehicle control system, the DPB system 14, and/or the ESC system 16. The method 100 is described with respect to the DPB controller 34 (e.g., using the DPB electronic processor 40 the DPB memory 44, the DPB input/output interface 46, and/or the high speed communication interface 48).

The method 100 includes receiving sensor data from the modified ESC controller 50*b* via the high speed communication connection 28 (at block 104). The DPB controller 34 may also receive additional sensor data from the sensors 22 via the bus 30. The method 100 includes determining, based on the sensor data, a hydraulic pressure requirement for each of the brakes 26 in the vehicle 10 (at block 108).

The method 100 also includes transmitting a command to the DPB pressure generating unit 36 to generate hydraulic pressure (at block 112). The method 100 further incudes transmitting, via the high speed communication connection 28, a valve control command to the modified ESC controller 50*b* to modulate the valves 54*a* for receiving the hydraulic fluid (at block 116).

It should be understood that blocks of the method 100 may be executed in a different order than illustrated in FIG. 7. Additionally, blocks of the method 100 may be executed in parallel with one another.

Figure 8:
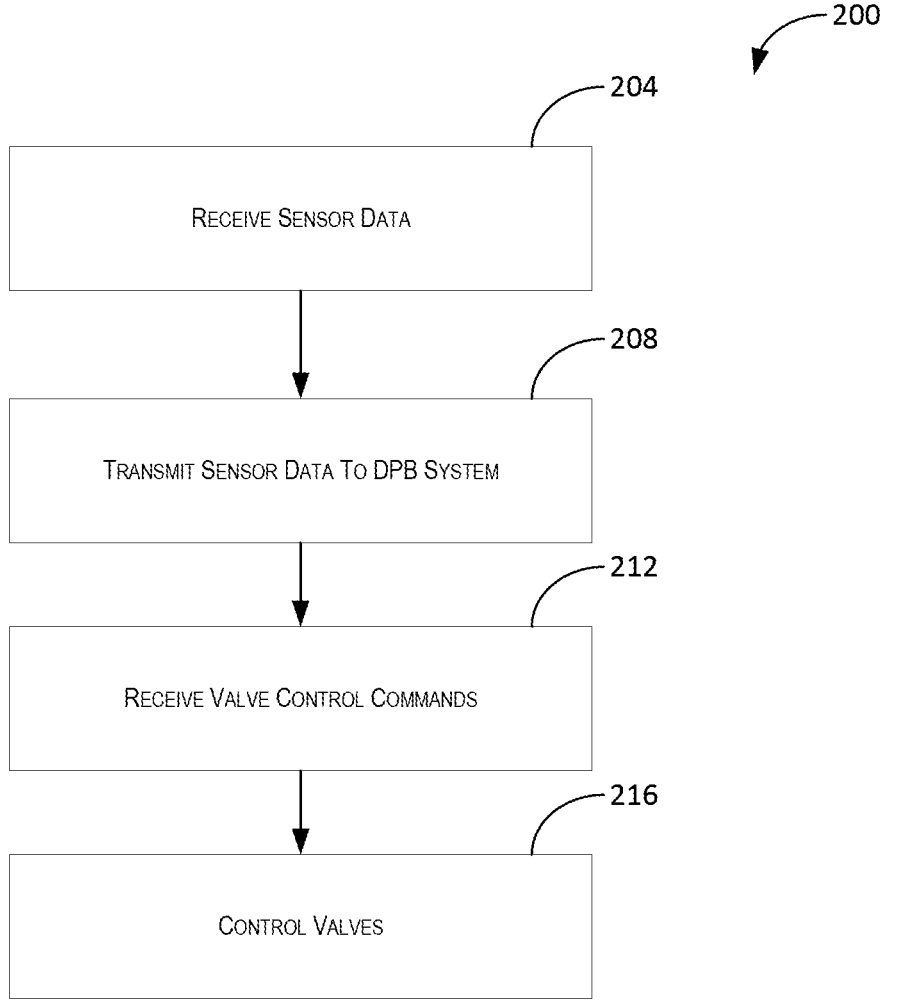
FIG. 8 illustrates a method executed by the modified electronic stability controller of FIG. 5 for performing hydraulic braking, according to some aspects.

FIG. 8 illustrates a method 200 executed by the modified ESC controller 50*b* for performing hydraulic braking in the vehicle 10. The method 200 can be used with the method
100 described above performed by the DPB system 14. The
method 200 includes receiving sensor data from the sensors
22 via the bus 30 (at block 204). The method 100 includes
transmitting some or all of the sensor data to the DPB
controller 34 via the high speed communication connection
28. In some instances, the modified ESC controller 50b
processes the sensor data prior to transmitting the sensor
data to the DPB controller 34.

The method 200 includes receiving a valve control com-
mand from the DPB controller 34 via the high speed
communication connection 28 (at block 212). The valve
control command is a control command for modulating
specific ones of the valves 54b based on hydraulic pressure
requirements computed by the DPB controller 34. The
method 200 further includes transmitting a control signal to
the valves 54b based on the valve control command (at block
216).

It should be understood that blocks of the method 200
may be executed in a different order than illustrated in FIG.
8. Additionally, blocks of the method 200 may be executed
in parallel with one another.

Thus, aspects herein provide, among other things, systems
and methods for hydraulic braking in a vehicle.

What is claimed is:

1. A system for a vehicle, the system comprising:
a set of hydraulically controlled brakes;
a set of valves coupled to the set of hydraulically con-
trolled brakes and configured to modulate hydraulic
pressure applied to each of the hydraulically controlled
brakes;
a first hydraulic system including a primary hydraulic
pressure generator, and a first controller; and
a second hydraulic system including a backup hydraulic
pressure generator and a second controller;
wherein the first controller is configured to
receive sensor data,
based on the sensor data, determine an amount of hydrau-
lic pressure to apply to each of the hydraulically
controlled brakes,
transmit a pressure command to the primary hydraulic
pressure generator for generating hydraulic pressure,
and
transmit, using a high speed communication connection a
valve control command to the second controller;
wherein the second controller is configured to
receive the valve control command, and
based on the valve control command, transmit a control
signal to the set of valves for modulating the set of
valves.

2. The system of claim 1, wherein the primary hydraulic
pressure generator is larger than the backup hydraulic pres-
sure generator.

3. The system of claim 1, wherein the second controller is
configured to transmit the sensor data to the first controller
using the high speed communication connection.

4. The system of claim 3, wherein the high speed com-
munication connection is an Ethernet connection.

5. The system of claim 1, wherein the primary hydraulic
pressure generator includes a plurality of damping elements.

6. The system of claim 1, wherein the first hydraulic
system is a decoupled power brake system, and the first
controller is a decoupled power brake controller.

7. The system of claim 1, wherein the second hydraulic
system is an electronic stability control system, and the
second controller is an electronic stability controller.

8. The system of claim 1, wherein the first controller is
configured to compute a hydraulic pressure requirement for
at least one selected from the group consisting of anti-lock
braking, vehicle dynamic stabilization, traction control, fad-
ing support, highly automated driving (HAD) backup,
regenerative brake blending, driver comfort braking,
autonomous braking, and brake assist.

9. A method implemented in a vehicle braking system, the
method comprising:
with a first controller included in a first hydraulic system
having a primary hydraulic pressure generator:
receiving sensor data,
based on the sensor data, determining an amount of
hydraulic pressure to apply to each brake of a set of
hydraulically controlled brakes,
transmitting a pressure command to the primary hydraulic
pressure generator for generating hydraulic pressure,
and
transmitting, using a high speed communication connec-
tion a valve control command to a second controller
included in a second hydraulic system having a backup
hydraulic pressure generator; and
with the second controller:
receiving the valve control command, and
based on the valve control command, transmitting a
control signal to a set of valves coupled to the set of
hydraulically controlled brakes, the control signal used
for modulating the set of valves.

10. The method of claim 9, wherein the primary hydraulic
pressure generator is larger than the backup hydraulic pres-
sure generator.

11. The method of claim 9, further comprising:
transmitting, with the second controller, the sensor data to
the first controller using the high speed communication
connection.

12. The method of claim 11, wherein the high speed
communication connection is an Ethernet connection.

13. The method of claim 9, wherein the primary hydraulic
pressure generator includes a plurality of damping elements.

14. The method of claim 9, wherein the first hydraulic
system is a decoupled power brake system, and the first
controller is a decoupled power brake controller.

15. The method of claim 9, wherein the second hydraulic
system is an electronic stability control system, and the
second controller is an electronic stability controller.

16. The method of claim 9, further comprising:
with the first controller, computing a hydraulic pressure
requirement for at least one selected from the group
consisting of anti-lock braking, vehicle dynamic stabi-
lization, traction control, fading support, highly auto-
mated driving (HAD) backup, regenerative brake
blending, driver comfort braking, autonomous braking,
and brake assist.

* * * * *